(12) United States Patent
Mohanty et al.

(10) Patent No.: US 7,420,011 B2
(45) Date of Patent: Sep. 2, 2008

(54) METHODS OF MAKING NANOCOMPOSITES AND COMPOSITIONS OF RUBBER TOUGHENED POLYHYDROXYALKANOATES

(75) Inventors: Amar K. Mohanty, Lansing, MI (US); Yashodhan Parulekar, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 358 days.

(21) Appl. No.: 11/199,463

(22) Filed: Aug. 8, 2005

(65) Prior Publication Data

US 2007/0015858 A1 Jan. 18, 2007

Related U.S. Application Data

(60) Provisional application No. 60/676,204, filed on Apr. 29, 2005, provisional application No. 60/602,847, filed on Aug. 19, 2004.

(51) Int. Cl.
*C08K 3/34* (2006.01)
(52) U.S. Cl. .................. 524/398; 524/177; 524/445
(58) Field of Classification Search ............ 524/445, 524/177, 398
See application file for complete search history.

(56) References Cited

U.S. PATENT DOCUMENTS

| | | | |
|---|---|---|---|
| 2,694,692 A | | 11/1954 | Amos et al. |
| 4,306,040 A | | 12/1981 | Baer et al. |
| 5,714,573 A | | 2/1998 | Randall et al. |
| 6,407,155 B1 | * | 6/2002 | Qian et al. .................. 524/445 |
| 2007/0173603 A1 | * | 7/2007 | Murakami et al. ............ 525/63 |

OTHER PUBLICATIONS

Lu, et al., Journal of Applied Polymer Science, vol. 76, 311-319 (2000).
Bartzcak et al., Polymer, 40, 2331-2346 (1999).
Bartzcak et al., Polymer, 40, 2347-2365 (1999).
Macromol. Mater. Eng. 289 360-367 (2004).
D.M. Laura et al., Polymer 42, 6161-6172 (2001).
Ismail, H. and Suryadiansyah, Journal of Reinforced Plast. And Composites, 23 ,6, 639-650 (2004).
Van der Wal et al., Polymer, 39, 26, 6781-6787 (1998).
Van der Wal et al., Polymer, 40, 6031-6075 (1999).
Ishiaku et al., Journal of Applies Polymer Science. vol. 73, 75-83 (1999).
Ishiaku et al., Journal of Applies Polymer Science, vol. 69, 1357-1366 (1998).
Mehta et al., Journal of Applied Polymer Science, vol. 92, 928-936 (2004).
Messersmith, P.B., et al., Chem Mater 6, 1719 (1994).
Yano, K., et al., J. Poly Sci Part A: Polym Chem., 31, 2493 (1993).
Vaia, R.A., et al., Chem Mater 5, 1694 (1992).
Wang, Z., et al., Chem Mater 10, 3769 9 (1998).
Ke, Y., et al., J. Appl Poly Sci 71, 1139 (1999).
Hasegawa, N., et al., J. Appl. Polym. Sci. 63, 137 (1997).
Mohanty, A.K., et al., Proceedings of 9th Annual Global Plastics Environmental Conference (GPEC 2002), Feb. 26 & 27, 2003, Detroit, MI, Society of Plastics Engineers, Plastics Impact on the environment, Full paper published in the Proceedings 69-78, (2003).
Maruyama, T., et al., Rubber nanocomposites containing layered clay minerals well dispersed therein, Jpn. Kokai Tokkyo Koho (2004).

* cited by examiner

*Primary Examiner*—Peter D Mulcahy
(74) *Attorney, Agent, or Firm*—Ian C. McLeod

(57) ABSTRACT

Toughened compositions from polyhydroxyalkanoate (PHA), preferably PHB reactively blended with maleated poly butadiene and with an epoxidized natural or synthetic rubber are described. The compositions preferably include clay nanoparticles which can be organically modified and can be exfoliated by the blend. The compositions can be used in a variety of applications, including automotive uses.

20 Claims, 9 Drawing Sheets

METHODS OF MAKING NANOCOMPOSITES AND COMPOSITIONS OF RUBBER TOUGHENED POLYHYDROXYALKANOATES

CROSS-REFERENCE TO RELATED APPLICATIONS

This application claims priority to Provisional Application Ser. No. 60/676,204, filed Apr. 29, 2005 and Ser. No. 60/602,847, filed Aug. 19, 2004.

STATEMENT REGARDING FEDERALLY SPONSORED RESEARCH OR DEVELOPMENT

This invention was supported by a grant from the Environmental Protection Agency Grant No. RD 830904. The U.S. Government has certain rights to this invention.

STATEMENT REGARDING GOVERNMENT RIGHTS

Not Applicable

BACKGROUND OF THE INVENTION (1) Field of the Invention

Polyhydroxyalkanoates (PHAs), particularly polyhydroxybutyrate (PHB), are biodegradable polyesters derived from renewable resources and have shown excellent promise as environmentally friendly substitute for polypropylene (PP). This invention aims to reduce the inherent brittleness of PHA's (PHB), while retaining their attractive stiffness and strength, by incorporating functionalized (reactive) rubbers. This provides significant improvement in toughness with minimum compromise in the stiffness. Preferably clays are provided in the composites.

(2) Description of Related Art

Many semi-crystalline polymers like PHB, Nylon and PP exhibit very attractive strength and ductility at room temperature and under moderate rates of deformation. However, they become brittle under severe conditions of deformation such as low temperature or high strain rates, and can undergo a sharp ductile-to-brittle transition (Lu, et al., Journal of Applied Polymer Science, Vol. 76, 311-319 (2000)). In the brittle regime a crack can propagate with little resistance. Because of this poor performance at extreme conditions there has been considerable commercial and scientific interest in the toughening of semi-crystalline thermoplastics. An extensive literature is now available on the toughening of commodity as well as engineering polymers such as polyethylene (Bartzcak et al., Polymer, 40, 2331-2346 (1999); Bartzcak et al., Polymer, 40, 2347-2365 (1999); and Macromol. Mater. Eng. 289 360-367 (2004)), polyamide (D. M. Laura et al., Polymer 42, 6161-6172 (2001)), polypropylene (Ismail, H. and Suryadiansyah, Journal of Reinforced Plast. And Composites, 23, 6, 639-650 (2004); Van der Wal et al., Polymer, 39, 26, 6781-6787 (1998); and Van der Wal et al., Polymer, 40, 6031-6075 (1999)) and polyvinylchloride [Ishiaku et al., Journal of Applied Polymer Science, Vo. 73, 75-83 (1999); and Ishiaku et al., Journal of Applied Polymer Science, Vol. 69, 1357-1366 (1998)).

Under proper conditions and using appropriate compatibilizers, synergistic effects arise to create high impact toughened polyolefins (TPO). Typically, a stiff filler material is incorporated into this TPO matrix to overcome the lost stiffness and strength. These fillers were conventionally glass fibers (Mehta et al., Journal of Applied Polymer Science, Vol. 92, 928-936 (2004)) but recent developments and results (Okada, O., et al., Mater Res Soc. Symp Proc., 171, 45 (1990); Pinnavaia, T. J., et al., ACS Symp Ser 622, 250 (1996); Messersmith, P. B., et al., Chem Mater 6, 1719 (1994); Yano, K., et al., J. Poly Sci Part A: Polym Chem., 31, 2493 (1993); Vaia, R. A., et al., Chem Mater 5, 1694 (1993); Wang, Z., et al., Chem Mater 10, 3769 (1998); Ke, Y., et al., J. Appl Polym Sci 71, 1139 (1999); Hasegawa, N., et al., J. Appl. Polym. Sci. 63, 137 (1997); and Mohanty, A. K., et al., Proceedings of $9^{th}$ Annual Global Plastics Environmental Conference (GPEC 2002), Feb. 26 & 27 (2003), Detroit Mich., Society of Plastics Engineers, Plastics Impact on the environment, Full paper published in the Proceedings 69-78, (2003)). Use of a nanoclay has been described in TPO's.

The incorporation of rubber particles into a brittle thermoplastic matrix is known to improve the impact properties and the toughness of the polymer (Amos, J. L., et al., U.S. Pat. No. 2,694,692 (1954); Baer, et al., U.S. Pat. No. 4,306,040 (1981); and Patel, P., et al., Rubber-toughened thermoplastics, Brit. Pat. (1978)). Under proper conditions and using appropriate compatibilizers, synergistic effects arise to create high impact toughened blends. But, adding low modulus rubber particles to the polymer lowers the stiffness and strength and this reduction in rigidity significantly lowers the scratch/mar resistance of the resulting blends. This problem has hindered the growth of rubber-toughened thermoplastics in the automotive industry. Hence, to overcome this brittleness, high modulus fillers like clay are incorporated into the toughened blend which, with optimal processing and chemistry, can regain this lost strength and stiffness (Suzuki, K., et al., Thermoplastic resin nanocomposites with good heat and impact resistance and rigidity for automobiles, Jpn. Kokai Tokyo Koho (2004); Ito, T., et al., Manufacture of polyolefin compositions for automobile parts with improved rigidity and heat resistance, Jpn. Kokai Tokkyo Koho (2004): and Maruyama, T., et al., Rubber nanocomposites containing layered clay minerals well dispersed therein, Jpn. Kokai Tokkyo Koho (2004)). General Motors and supplier partners recently launched a nanocomposite TPO-based step-assist which was the first instance of a nanocomposite material being used in automotive exterior applications (http://www.scprod.com/gm.html).

However PP and subsequently TPO are both non-biodegradable and also petroleum-based. Vast amounts and varieties of such plastics, notably polyolefins, are currently produced from fossil fuels, consumed and discarded into the environment, ending up as un-degradable wastes. Manufacturers are looking for alternative eco-friendly green materials that can replace these non-renewable-resource based non-biodegradable materials. Numerous recent federal acts and executive orders encourage the development of biobased products to assist in 'greening' the country through recycling and waste-prevention. These green biomaterials not only protect the environment and reduce greenhouse gasses but also increase national security by reducing dependency on foreign oil for our needs.

Another route to overcome the inherent brittleness of polyhydroxybutyrate is by using polyhydroxybutyrate-hydroxyvalerate (PHBV) copolymers, which have low levels of valerate. However, PHBV exhibits lower melting point than PHB and so narrows the utilization temperature range of the composition. PHBV is also costlier than PHB and this hinders its scope and usage.

U.S. Pat. No. 5,714,573 to Randall et al describes polylactide polymer compositions. The present invention does not use lactide polymers.

Based on the above literature, the following problems were identified with conventional toughened polymers:

1) The incorporation of rubber particles into a brittle thermoplastic matrix is known to improve the impact properties and the toughness of the PHA polymer but only under proper conditions and using compatiblizers.
2) Adding elastomer particles to the PHA polymer lowers stiffness and strength and this reduction in rigidity significantly lowers the scratch/mar resistance of the resulting blends.
3) Stiffness and strength of the PHA polymer can be regained by adding a stiff reinforcement like nanoclay but property improvements are only achieved if optimum dispersion and compatibility are created.
4) Clay is inherently hydrophilic and hence does not mix with the PHA polymer matrix. This leads to agglomeration and poor properties and this has to be overcome by modifying the clay surface.
5) Conventional TPO's are based on non-renewable resources and hence are not sustainable or ecofriendly and there is a need for alternative eco-friendly green materials that can replace these non-renewable-resource based non-biodegradable materials.
6) Performance limitations and high cost however have limited these PHA biopolymers to niche markets.
7) PHB is typically a bacterial biobased polymer. It has mechanical properties very similar to the matrix polymer PP in TPO. However, PHB's main drawbacks are its brittleness and thermal instability.

OBJECTS

It is an object of this invention to improve the toughness and impact strength of PHA's without compromising its inherent stiffness and strength. It is also an object of the present invention to provide PHA composites which are relatively inexpensive and easy to manufacture. These and other objects will become increasingly apparent by reference to the following description.

SUMMARY OF THE INVENTION

The present invention relates to a toughened polymer composition which comprises a reacted mixture of:
(a) a polyhydroxy alkanoate (PHA) polymer:
(b) a maleated polybutadiene rubber; and
(c) an epoxidized natural or synthetic rubber, wherein the mixture has been reactively blended in proportions to produce a polymer which is toughened in relation to PHA alone. The PHA's are derived from monomers containing 4 to 8 carbon atoms.

The present invention also relates to a composition derived from a reactively blended admixture comprising:
(a) between about 50 and 60 parts by weight of a polyhydroxyalkanoate (PHA) polymer having a molecular weight between about 100,000 and 1,000,000 and repeating alkanoate units having 1 to 8 carbon atoms;
(b) between about 5 and 20 parts by weight of a maleated polybutadiene rubber having a molecular weight between about 1500 and 7500; and
(c) between about 10 and 40 parts by weight of an epoxidized natural or synthetic rubber.

Preferably the PHA is polyhydroxybutyrate (PHB). Preferably between 10 and 30 parts by weight of a plasticizer is reactively blended in the admixture. Preferably 1 to 15 parts by weight of clay is reactively blended in the admixture. Preferably the clay is a natural clay which is unmodified. Preferably the clay is an organic onium ion modified clay. Preferably the clay is a quaternary ammonium modified clay. Preferably the clay has been modified by reaction with a titanate coupling agent containing 48 to 60 carbon atoms. Preferably the metal coupling agent is titanate coupling agent containing 60 carbon atoms. Preferably the clay is modified by addition of 1 to 15 parts by weight of the titanate coupling agent. Preferably the modification is done in aromatic solvent. Preferably the modification is done in an aliphatic solvent. Preferably the modification is done by solvent-less reaction. Preferably the modification technique atomizes and sprays the coupling agent directly onto the clay.

The present invention also relates to a process for producing a toughened polymer which comprises reactively blending an admixture of:
(a) a polyhydroxy alkoxide (PHA) polymer:
(b) a maleated polybutadiene rubber; and
(c) an epoxidized natural or synthetic rubber, wherein the composition has been reactively blended in proportions to produce a polymer which is toughened in relation to PHA alone.

The present invention also relates to a process for producing a toughened polymer which comprises reactively blending an admixture of:
(a) between about 50 and 60 parts by weight of a polyhydroxyalkanoate (PHA) polymer having a molecular weight between about 100,000 and 1,000,000 and repeating alkanoate units having 1 to 8 carbon atoms;
(b) between about 5 and 20 parts by weight of a maleated polybutadiene rubber having a molecular weight between about 1500 and 7500; and
(c) between about 10 and 40 parts by weight of an epoxidized natural or synthetic rubber. Preferably the PHA is polyhydroxybutyrate (PHB). Preferably between 10 and 30 parts by weight of a plasticizer is reactively blended in the admixture. Preferably 1 to 15 parts by weight of clay is reactively blended in the admixture. Preferably the clay is a natural clay which is unmodified. Preferably the clay is an organic onium ion modified clay. Preferably the clay is a quaternary ammonium modified clay. Preferably the clay has been modified by reaction with a titanate coupling agent containing 48 to 60 carbon atoms. Preferably the metal coupling agent is a titanate coupling agent containing 60 carbon atoms. Preferably the clay is modified by addition of 1 to 15 parts by weight of the titanate coupling agent. Preferably the modification of the clay is done in an aromatic solvent. Preferably the modification of the clay is done in an aliphatic solvent. Preferably the modification is done by a solvent-less reaction. Preferably the modification technique atomizes and sprays the titanate coupling agent directly onto the clay.

The present invention particularly relates to a polymer composition which comprises a reacted blend of (a) polyhydroxybutyrate (PHB); (b) epoxidized natural or synthetic rubber (ENR); (c) maleated polybutadiene rubber (MR); and (d) optionally an organometallic modified clay (OMC).

Further the present invention relates to a process for preparing a polymer composition which comprises melt compounding in an extruder, a mixture of PHB; epoxidized natural or synthetic rubber (ENR); maleated polybutadiene rubber (MR); and optionally an organometallic modified clay (OMC). The invention also relates to a process for modifying the pristine clay using either solvent-based solution technique or non-solvent atomizing technique.

This invention uses epoxidized natural or synthetic rubber as the impact modifier which has reactive centers for interaction with the PHB matrix. This invention also uses maleated rubber as interfacial compatibilizer. Preferably the clay is treated with a titanate-based coupling agent. All the above factors synergistically combine to create a High impact-high strength material with improved impact strength and improved modulus due to good interfacial bonding and dispersion of the nano-filler.

The titanate coupling agents are a broad class of neoalkoxy titanates. The chemical description of the preferred titanate is titanium IV 2,2(bis 2 propenolatomethyl)butanolato, tris(dioctyl)pyrophosphato-O. The structure and a different nomenclature is shown in Scheme 4.

BRIEF DESCRIPTION OF FIGURES

FIG. 1D shows the overall apparatus.

DESCRIPTION OF PREFERRED EMBODIMENTS

The chemical structures of PHB, Natural rubber and epoxidized natural rubber are shown in Schemes 1, 2 and 3 respectively.

Polyhydroxybutyrate, PHB (Biomer P226) with 23 wt. % citrate plasticizer was supplied by Biomer (Germany). Epoxidized natural or synthetic rubber (ENR 25), which is a chemically-modified form of natural or synthetic rubber with epoxide rings on the chain, with 25% epoxidization, was used as the functionalized rubber. The maleated rubber compatibilizer (RI 130 MA20) was provided by Sartomer (Exton, Pa.).

Scheme 1: Structure of Polyhydroxybutyrate

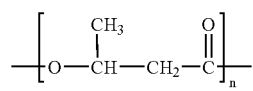

Scheme 2: Structure of natural rubber

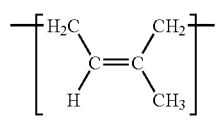

Scheme 3: Structure of expoxidized natural rubber

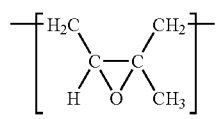

Commercially modified montmorillonite (organoclay) (Cloisite 30B) was purchased from Southern Clay (Gonzales, Tex.) and pristine clay (PGW) was purchased from Nanocor (Arlington Heights, Ill.). The ammonium cation of Cloisite 30B, is methyl tallow bis-2-hydroxyethyl quaternary ammonium.

Titanate based coupling agents were provided by Kenrich Petrochemicals as LI-38 neopentyl(diallyloxy)tri(dioctyl)pyrophospato titanante. The structures are shown in Scheme 4.

Scheme 4: Chemical structure of neopentyl (diallyl) oxy tri (dioctyl) pyrophosphato titanate

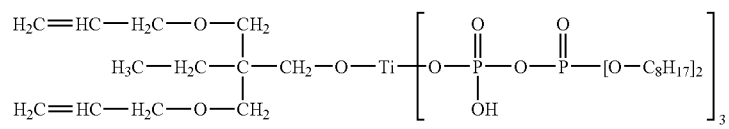

Baseline data for comparison studies was obtained using a commercial TPO from Basell. The materials and suppliers are shown in Table 1.

TABLE 1

Materials list

| Material | Name | Tradename | Supplier | Location |
|---|---|---|---|---|
| Polyhydroxybutyrate | PHB | Biomer ® P-226 | Biomer | Krailling, Germany |
| Epoxidized Natural Rubber | ENR | Research Sample | Malaysian Rubber Board | Malaysia |
| Maleated Polybutadiene | MR | RI130MA20 | Sartomer | Exton, PA |
| Organically modified montmorillonite | OMMT | Cloisite ® 30B | Southern Clay Products Inc | Gonzales, TX |
| Pristine montmorillonite | Na+ MT | Cloisite Na+ | Southern Clay Products Inc | Gonzales, TX |
| neopentyl (diallyl)oxy tri(dioctyl) pyrophosphato titanate | Titanate based coupling agent | Ken-react ® LICA-38 | Kenrich Petrochemicals | Bayonne, NJ |
| Toluene | Toluene | Toluene 179418 ACS reagent, >99.5% | Aldrich | St. Louis, MO |
| Aliphatic hydrocarbon | Aliphatic Solvent | Kwik-Dri | Ashland Distribution | Columbus, OH |
| Thermoplastic Olefin | TPO | Medium impact research sample | Basell | Elkton, MD |

Figure 1A:
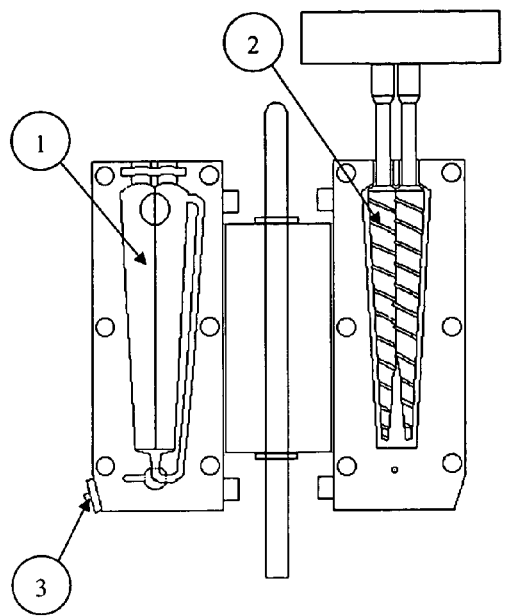
FIGS. 1A to 1D are drawings showing in FIGS. 1A to 1C a DSM microcompounder extruder with an injection molder for producing molded specimens, and a transfer pot.
Figure 1B:
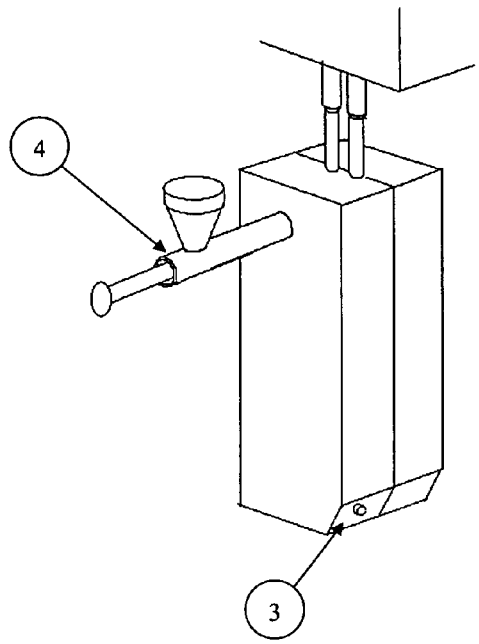
Figure 1C:
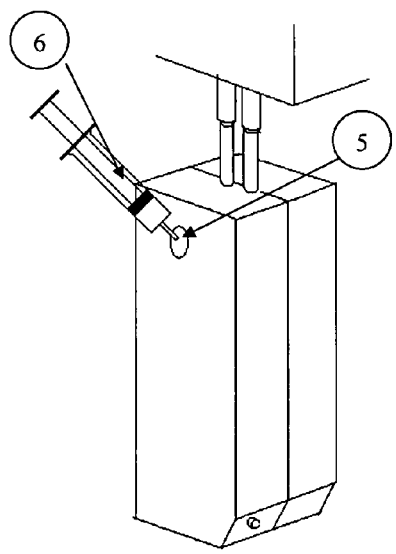
Figure 1D:
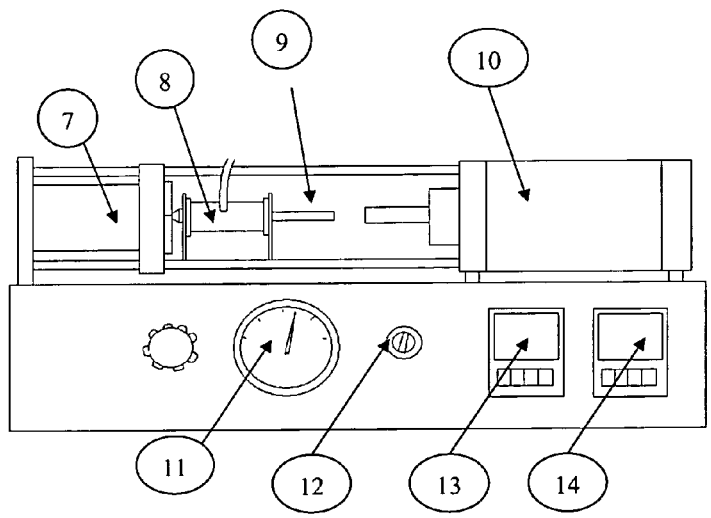
Figure 2:
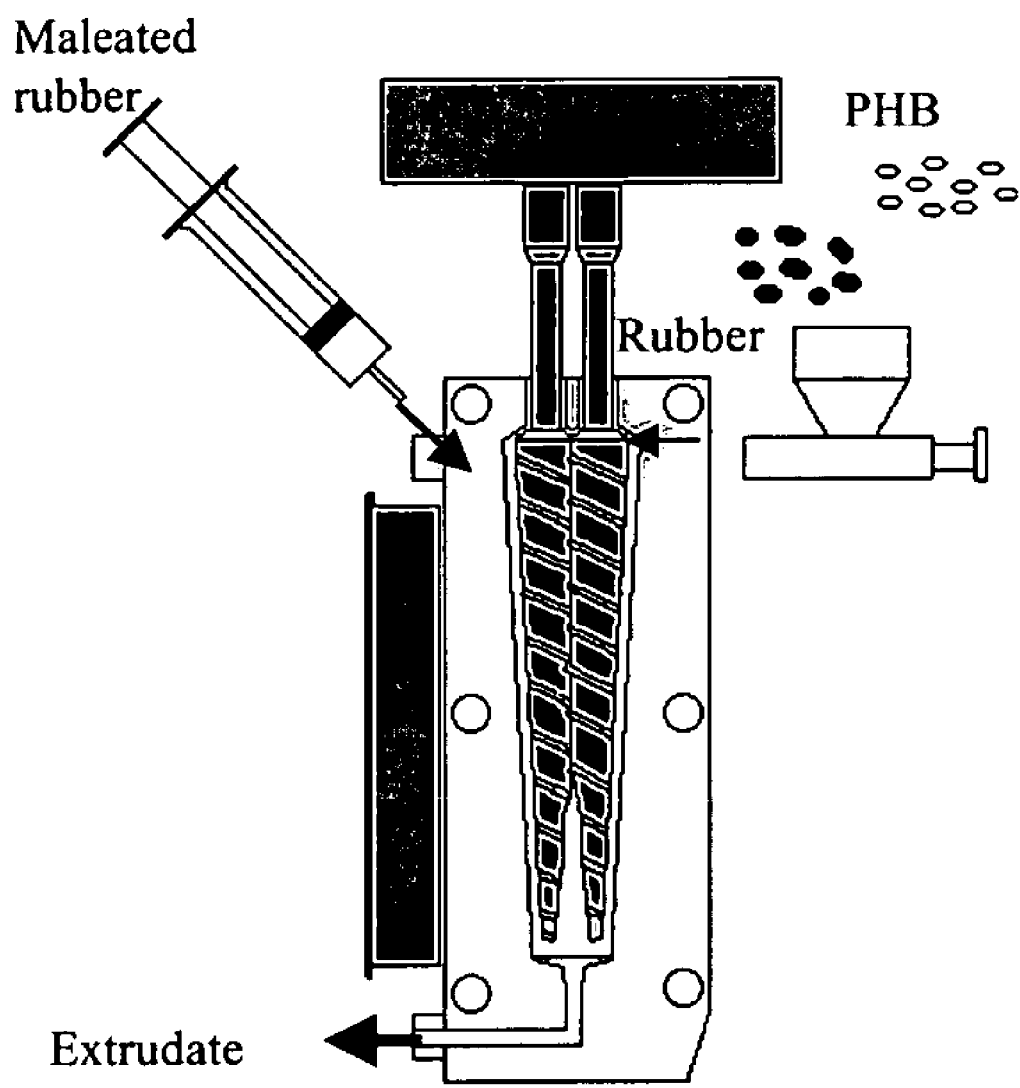
FIG. 2 is a drawing showing direct injection of liquid maleated rubber into PHB-rubber system.

The technique used for blending PHB and rubber was melt compounding in a microcompounder (FIGS. 1A to 1D). The parts are standard and are:

FIG. 1
1. Barrel
2. Screws
3. Exit port
4. Feeder
5. Feeder port
6. Injector
7. Mold and mold heater
8. Transfer cylinder
9. Piston
10. Pneumatic piston
11. Pressure gauge
12. Piston control knob
13. Mold temperature controller
14. Transfer Cylinder temperature controller This apparatus is a laboratory scale twin-screw extruder with an attached injection molder. Varying amount of rubber (10, 20, 30 and 40 wt. %) was blended with PHB at 200 rpm and 170° C. for 2-3 minutes along with varying amount of compatiblizers (5, 10 and 20 wt %). These compatiblizers are liquids and were incorporated into the PHB-rubber system by direct injection into the barrel (FIG. 2). These processing conditions were based on initial optimization studies. The optimized formulation is given in Table 2 (Run 3).

TABLE 2

| Run | PHB | Epoxidized rubber | Maleated rubber |
|---|---|---|---|
| 1 | 100 | — | — |
| 2 | 60 | 40 | — |
| 3 | 60 | 30 | 10 |

Clay modification: The surface of the clay platelets is inherently hydrophilic and is modified by surface treatments to make the platelet compatible with the organic polymer. This is achieved by exchanging the metal counterions from the clay surface with cationic-organic surfactants so as to form a molecular organophilic coating. The hydroxyl functionality on the surface of the clay platelet is substituted by an alkyl-titanate group from the titanate modifier making the surface organophilic. These titanate coupling agents form chemical bonds between inorganic and organic species via proton coordination and form an atomic layer on the surface of the clay by chemical modification. The large alkyl group also increases the inter-clay platelet spacing and hence facilitates intercalation and exfoliation.

Clay modification work was done on pristine montmorillonite clay (Nanocor PGV). In a first process, the coupling agent was coated onto the clay by two techniques; in one process the titanate-additive was dissolved in solvent and then the clay was dispersed into it and mixed for 2 hours. The solvent used is an aromatic toluene (Toluene, Aldrich Chemicals), and a non-aromatic aliphatic eco-friendly solvent (Qwikdri™, Ashland Chemicals) could also be used. Following the dispersion, the clay was decanted and dried for 5 hours at 55° C. to drive off the solvent.

Figure 3:
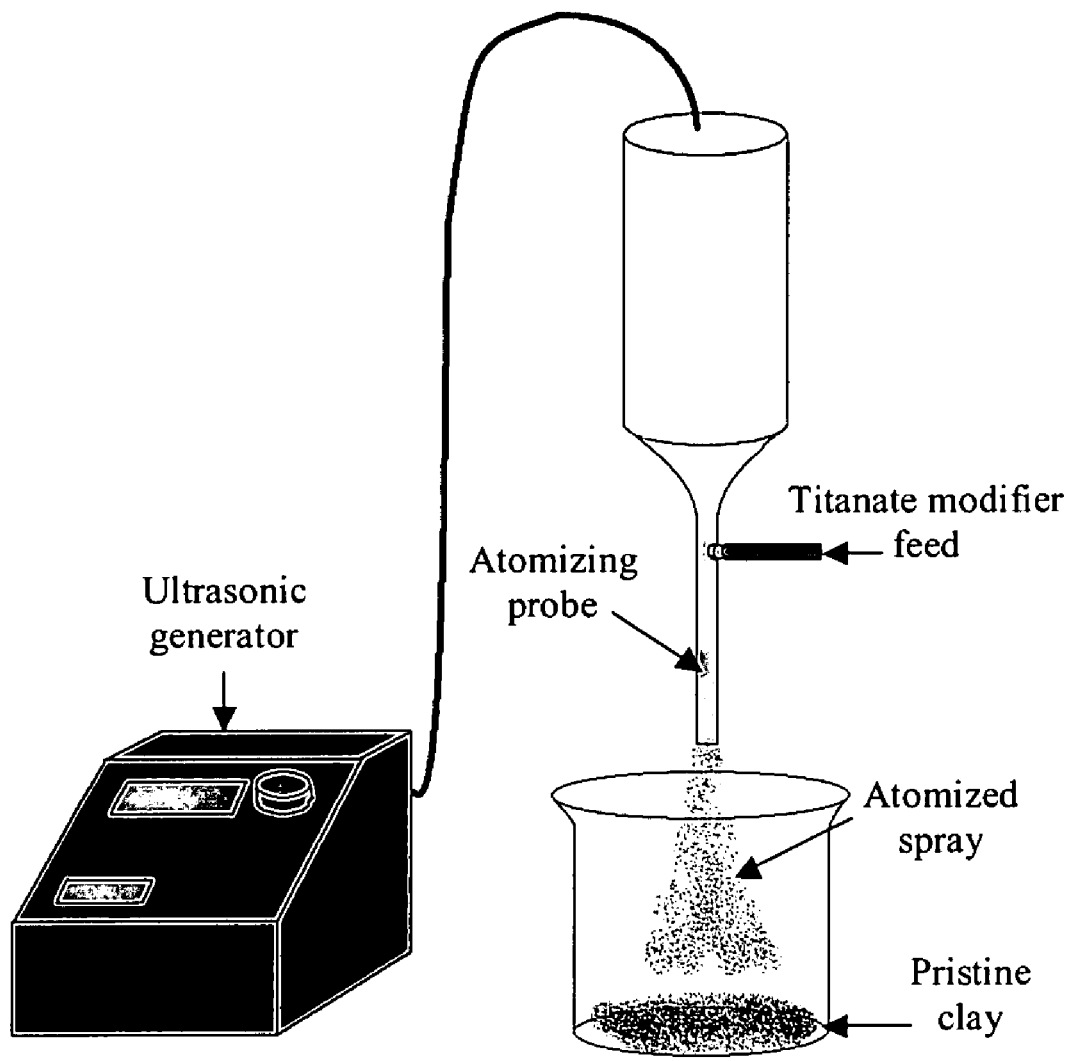
FIG. 3 is a drawing showing an atomizing-spraying process for clay modification.

The second process was by atomizing the coupling agent onto a fluidized bed of clay (FIG. 3). The atomizing was achieved by using a ultrasonic probe that produced a fine spray of the titanate-coupling agent directly onto the clay thus eliminating the need for any solvent. In both techniques, two levels of titanate loading were used; modified clay MC1 having modifier corresponding to 3.8% of clay weight and MC2 corresponding to 11.4% of clay weight. Nanocomposite fabrication was done by high-shear melt compounding in the microextruder (FIGS. 1 and 2). 2, 5 and 7 wt. % of each clay was added to the toughened PHB-rubber system and processed for 2 minutes at 200 rpm and then injection molded into testing samples. A sample formulation with 5 wt % clay in PHB and toughened PHB matrices is given in Table 3 (Run 3).

TABLE 3

| Run | PHB | Epoxidized rubber | Maleated rubber | Clay |
|-----|-----|-------------------|-----------------|------|
| 1 | 100 | — | — | 5 |
| 2 | 57 | 38 | — | 5 |
| 3 | 57 | 28.5 | 9.5 | 5 |

PHB and its blends with natural or synthetic rubber and epoxidized natural or synthetic rubber in presence and absence of compatiblizers and clays were molded into bars for impact studies, disks for morphology studies and beams for modulus measurements.

Characterization

Clay characterization: Surface elemental analysis was performed on an X-ray photoelectron spectrometer (XPS) using a Physical Electronics PHI-5400 ESCA workstation. A Thermometric Analyzer (TGA 2950, TA Instruments, DE) was used to determine the weight loss of the pristine and modified clays. These experiments were performed in platinum pans at a ramp rate of 10° C./min under a nitrogen purge flow (90 ml/min). The water contact angle for the clays were measured on a CAHN 322 microbalance (ThermoCahn, Wis.) in the wicking mode.

Thermal properties: Modulus measurements were obtained on a dynamic mechanical analyzer (2980 DMA), (TA instruments, DE) using dual cantilever mode and from −50° C. to 150° C.

Mechanical properties: Notched Impact properties of the toughened materials and their nanocomposites were measured according to ASTM D256 using a Testing Machines Inc. 43-02-01 Monitor/Impact machine with a 5 ft-lb pendulum. The samples were notched and conditioned for 48 hours before testing.

Results and Discussion

Toughened PHB

Figure 4:
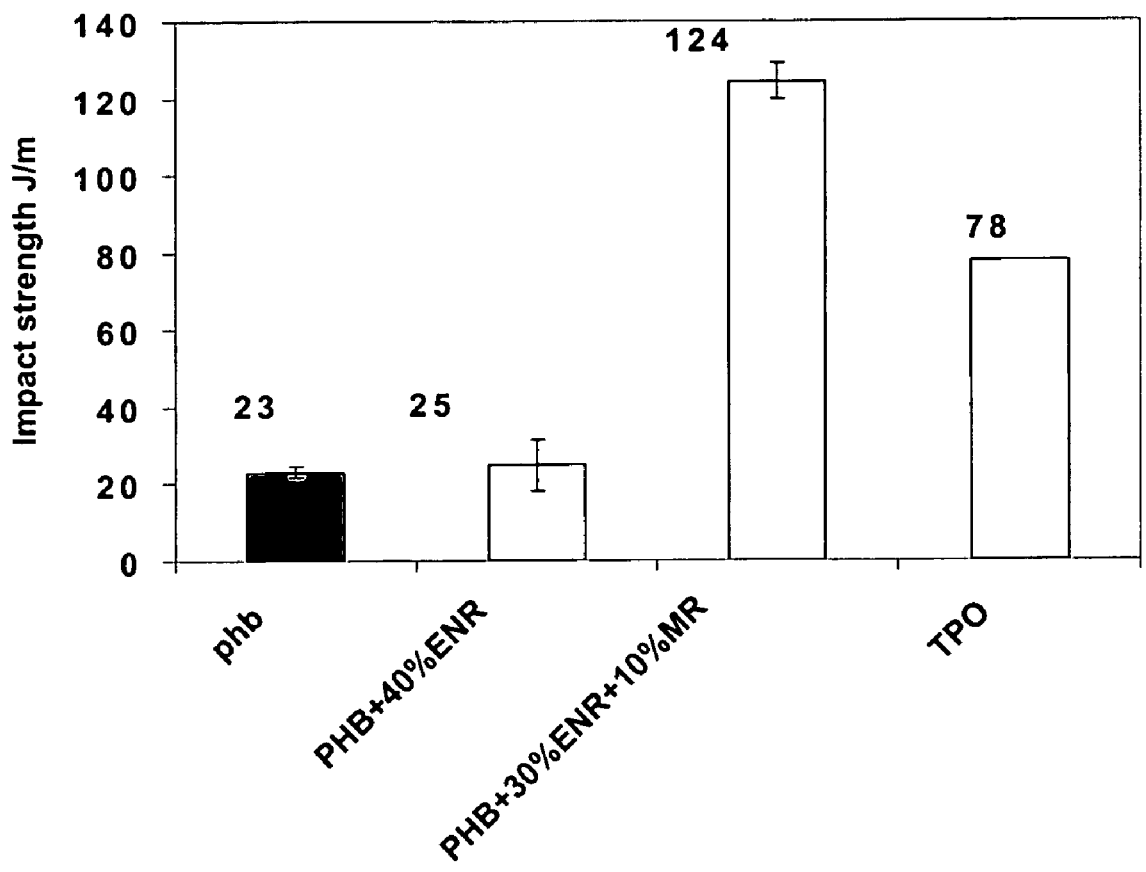
FIG. 4 is a graph showing the comparative impact strength of PHB-epoxidized natural rubber with maleated rubber compatibilizer versus other compositions.
Figure 5:
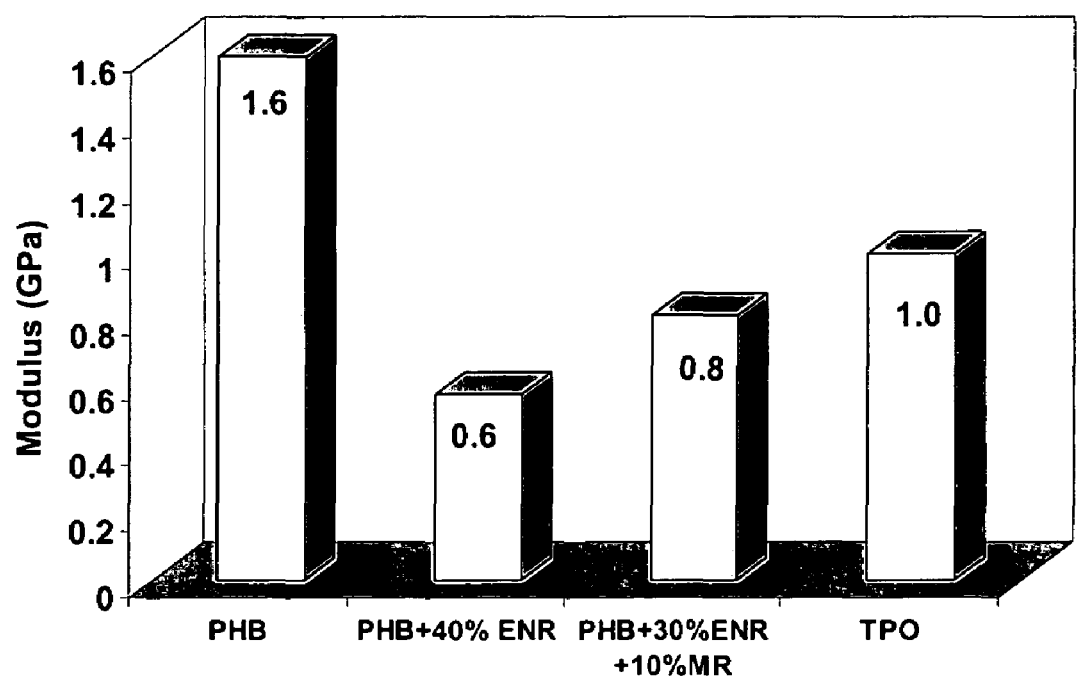
FIG. 5 is a graph showing comparative modulus of PHB-epoxidized natural rubber with maleated rubber-II compatibilizer versus other compositions.
Figure 6:
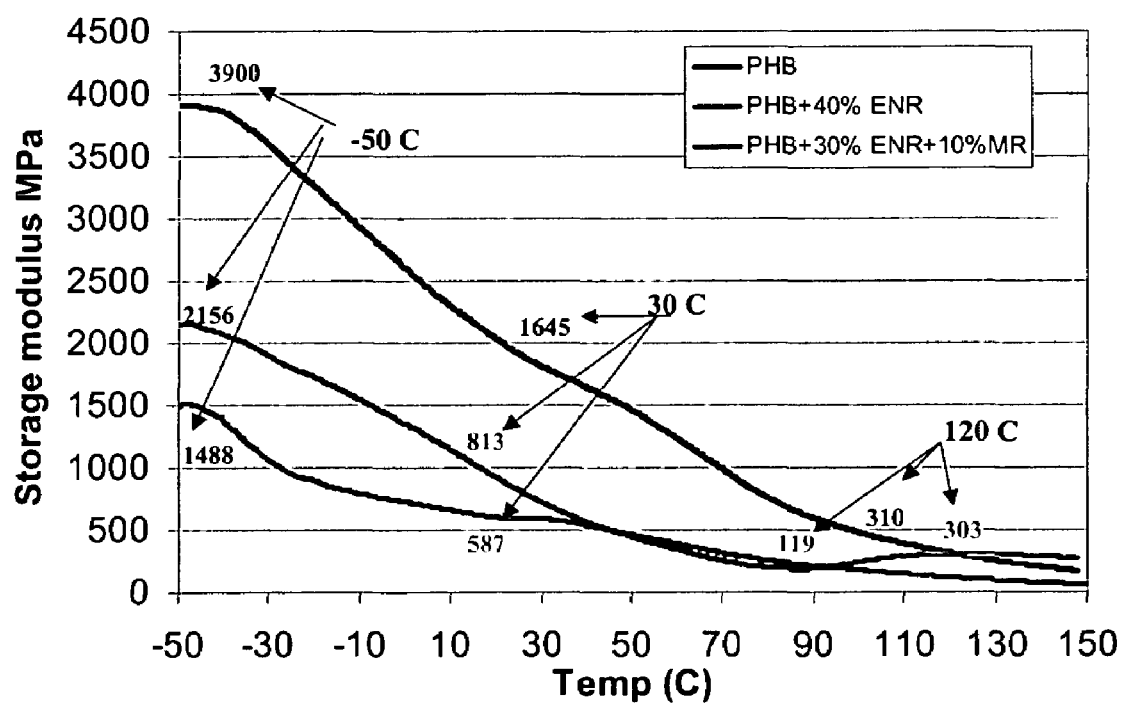
FIG. 6 is a graph showing a variation of the modulus of PHB and the toughened PHB with temperature versus other compositions.

Addition of up to 40% epoxidized natural rubber alone did not affect the impact strength of PHB but on addition of 10% of maleated rubber the impact strength improved by 440% (even more than TPO) (FIG. 4). The modulus of PHB was reduced by 63% by addition of ENR but only by 50% when maleated rubber and ENR were added together (FIG. 5). The compatibilizer also affects the modulus of the PHB-ENR system at depressed and elevated temperatures (FIG. 6). At −50° C., the modulus of PHB reduced by 63% by addition of ENR but only by 50% when maleated rubber and ENR were added together. Similar behavior was seen at room temperature (30° C.) and at 120° C. At 140° C. the modulus of the PHB-ENR-MR (288 Mpa) system is even higher that PHB (200 Mpa) possible due to crosslinking of the maleated rubber.

6.2 Clay Modification

XPS surface profile of the pristine clay shows the presence of silicon and aluminum atoms that are integral to the clay structure. The high oxygen atom concentration on the surface is attributed to the hydroxyl groups on the hydrophilic surface. These hydroxyl groups are targeted to be exchanged with alkyl-titanate complexes from the surface modifier in the modification reaction. The XPS spectra of the modified clay show significant reduction in the atomic concentration of oxygen thus justifying the modification mechanism. The titanium and phosphorous atoms in the alkyl-titanate complex from the surface modifier are also evident in the atomic profile.

|  | Pristine clay | Modified clay-1 | Modified clay-2 |
|---|---|---|---|
| Carbon | 20.59 | 33.07 | 35.53 |
| Nitrogen | 0.77 | 1.05 | 1.1 |
| Oxygen | 53.24 | 46.33 | 43.74 |
| Sodium | 1.64 | 0.82 | 0.87 |
| Aluminum | 6.47 | 5.45 | 4.52 |
| Silicon | 17.29 | 11.56 | 11.5 |
| Phosphorous | 0 | 1.3 | 2.03 |
| Titanium | 0 | 0.42 | 0.71 |

Figure 7:
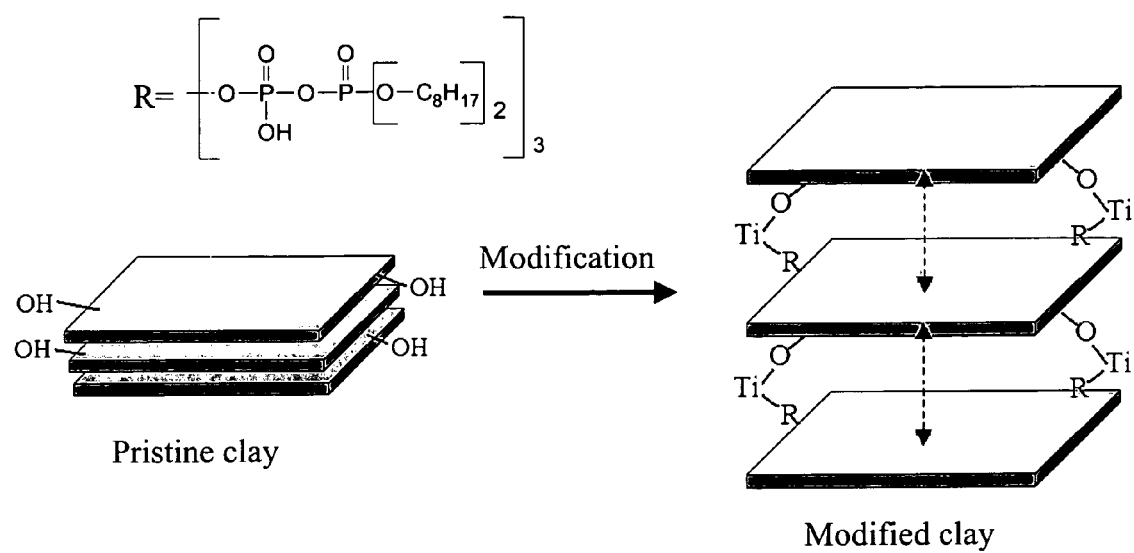
FIG. 7 is a schematic representation of the titanate modified clay.

FIG. 7 is a schematic drawing of the complex in the modified clay.

The TGA weight decomposition curves also indicate the presence of surface modification in both the treated clays as indicated by the lesser weight loss until 250° C. as compared to the pristine clay. The surface modification makes the hydrophilic clay surface organophilic that can be described by an increase in the contact angle for water. The contact angle for pristine clay was measured to be close to zero as is expected for the hydrophilic surface with ample hydroxyl groups capable of interacting with water. For the modified clay, the organic groups in the alkyl-titanate complex increase the surface energy of the clay surface. This increase in the surface energy reflects in decrease in wetability and thus the contact angle increases to about 44°. Thus the clay surface has successfully been modified to make it organophilic and thus ideal for organic matrices.

|  | Material constant (c) | Cos | Degrees |
|---|---|---|---|
| Pristine clay | 0.000142 | 0.9948 | 6.0 |
| Modified Clay-1 | 0.000165 | 0.8483 | 31.9 |
| Modified Clay-2 | 0.000275 | 0.7168 | 44.2 |

Nanocomposites

Figure 8:
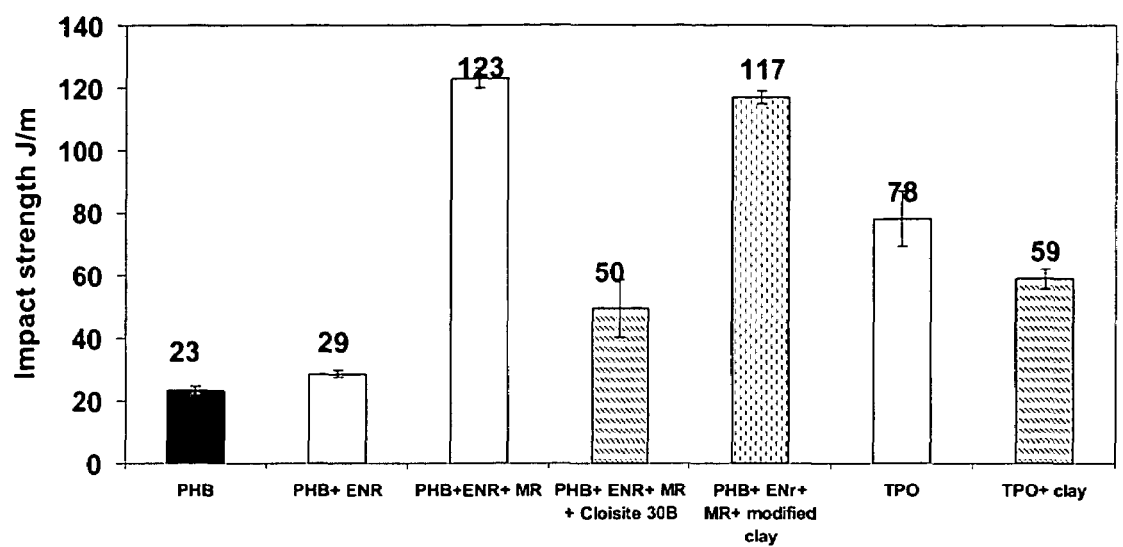
FIG. 8 is a graph showing the impact properties of toughened PHB nanocomposites versus other compositions.
Figure 9:
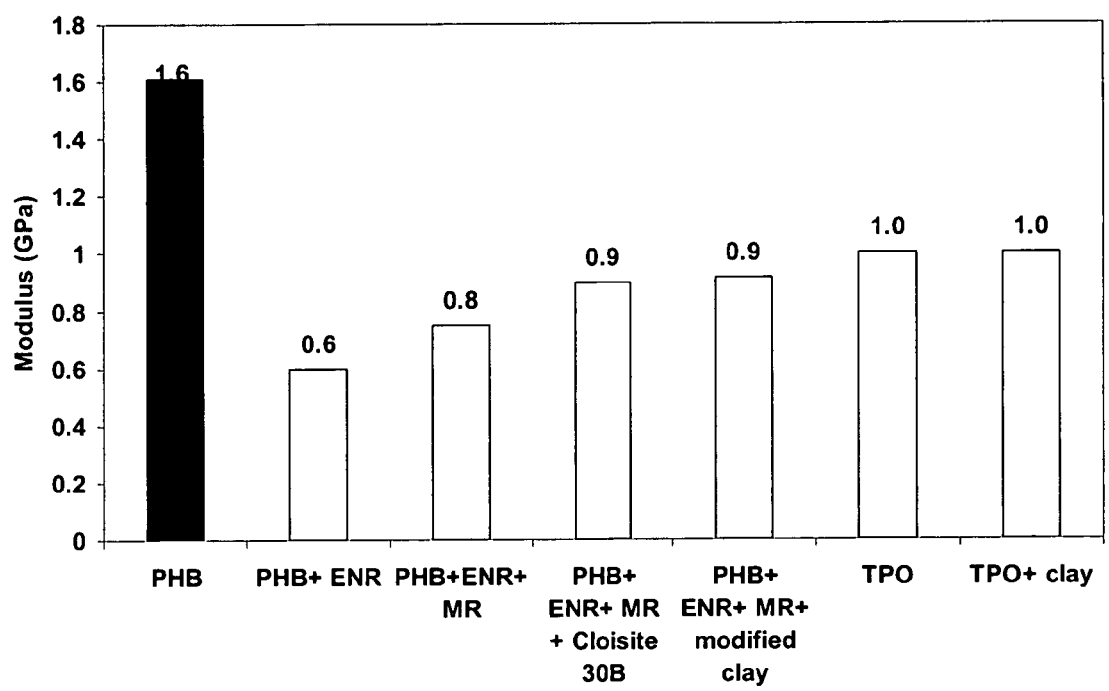
FIG. 9 is a graph showing modulus of toughened PHB nanocomposites versus other compositions.

Toughening of PHB with ENR and maleated rubber resulted in dramatic improvement in impact properties yet the modulus and consequently the stiffness of the material reduced. The nanoclay platelets were introduced to regain the stiffness to some extent. Addition of commercially modified clay (Cloisite 30B) reduced the impact properties due to absence of coupling between the filler and the matrix and this is seen by the reduction in impact strength from 124 j/m to 50 j/m (FIG. 8). But on addition of modified clay, the impact strength was regained to 117 j/m which is still 408% improvement over pure PHB and more than the impact of commercial toughened Polyolefin (TPO). In case of PHB-ENR without compatibilizer, the modulus drastically reduced possibly because the clay did not disperse but addition of coupling-agent treated clay (solvent method) improved modulus to 0.91 GPa. The modified clay provides a modulus comparable to TPO modulus (FIG. 9).

The compositions of the present invention can be used in settings where a toughened polyolefin would be used, such as automotive applications.

It is intended that the foregoing description be only illustrative of the present invention and that the present invention be limited only by the hereinafter appended claims.

We claim:

1. A toughened polymer composition which comprises a reacted mixture of:
   (a) a polyhydroxyalkanoate (PHA) polymer;
   (b) a maleated polybutadiene rubber;
   (c) an epoxidized natural or synthetic rubber; and
   (d) a clay which has been modified by reaction with a titanate coupling agent containing 48 to 60 carbon atoms to form a titanium alkyl group from a hydroxyl group on the clay, wherein the mixture has been reactively blended in proportions to produce a polymer which is toughened in relation to PHA alone.

2. The composition of claim 1 comprising without the clay:
   (a) between about 50 and 60 parts by weight of the polyhydroxyalkanoate (PHA) polymer having a molecular weight between about 100,000 and 1,000,000 and repeating alkanoate units having 1 to 8 carbon atoms;
   (b) between about 5 and 20 parts by weight of the maleated polybutadiene rubber having a molecular weight between about 1500 and 7500; and
   (c) between about 10 and 40 parts by weight of the epoxidized natural or synthetic rubber.

3. The composition of claim 1 wherein the PHA is polyhydroxybutyrate (PHB).

4. The composition of claims 1 or 2 wherein the metal coupling agent is the titanate coupling agent containing 60 carbon atoms.

5. The composition of claims 1 or 2 wherein the clay is modified by addition of 1 to 15 parts by weight of the titanate coupling agent per part of the clay.

6. The composition of claims 1 or 2 wherein the clay is modified in an aromatic solvent.

7. The composition of claims 1 or 2 wherein the clay is modified in an aliphatic solvent.

8. The composition of claims 1 or 2 wherein the clay is modified by a solvent-less reaction.

9. The composition of claims 1 or 2 wherein the clay is modified by a reaction which atomizes and sprays the coupling agent directly onto the clay.

10. A process for producing a toughened polymer which comprises reactively blending an admixture of:
    (a) a polyhydroxy alkoxide (PHA) polymer:
    (b) a maleated polybutadiene rubber;
    (c) an epoxidized natural or synthetic rubber; and
    (d) a clay which is an organic onium ion modified clay which has been modified by reaction with a titanate coupling agent containing 48 to 60 carbon atoms, wherein the composition has been reactively blended in proportions to produce a polymer which is toughened in relation to PHA alone.

11. The process of claim 10 for producing the toughened polymer which comprises without the clay:
    (a) between about 50 and 60 parts by weight of the polyhydroxyalkanoate (PHA) polymer having a molecular weight between about 100,000 and 1,000,000 and repeating alkanoate units having 1 to 8 carbon atoms;
    (b) between about 5 and 20 parts by weight of the maleated polybutadiene rubber having a molecular weight between about 1500 and 7500; and
    (c) between about 10 and 40 parts by weight of the epoxidized natural or synthetic rubber.

12. The process of claim 11 wherein the PHA is polyhydroxybutyrate (PHB).

13. The process of claim 11 wherein between 10 and 30 parts by weight of a plasticizer is blended in the admixture.

14. The process of claim 10 wherein the modified clay is a quaternary ammonium modified clay.

15. The process of claim 10 wherein the metal coupling agent is the titanate coupling agent containing 60 carbon atoms.

16. The process of claim 10 wherein the clay is modified by addition of 1 to 15 parts by weight of the clay of the titanate coupling agent.

17. The process of claim 10 wherein the clay is modified in an aromatic solvent.

18. The process of claim 10 wherein the clay is modified in an aliphatic solvent.

19. The process of claim 10 wherein the clay is modified in a solvent-less reaction.

20. The process of claim 10 wherein the clay is modified by a reaction which atomizes and sprays the titanate coupling agent directly onto the clay.

* * * * *